United States Patent
Cho et al.

(10) Patent No.: US 10,852,584 B2
(45) Date of Patent: Dec. 1, 2020

(54) METHOD FOR QUANTUM DOT-POLYMER COMPOSITE, QUANTUM DOT-POLYMER COMPOSITE, LIGHT CONVERSION FILM COMPRISING SAME, BACKLIGHT UNIT, AND DISPLAY DEVICE

(71) Applicant: LG ELECTRONICS INC., Seoul (KR)

(72) Inventors: Byoungkwon Cho, Seoul (KR); Jinmok Oh, Seoul (KR); Dongseon Jang, Seoul (KR); Juchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 15/567,304

(22) PCT Filed: Jan. 22, 2016

(86) PCT No.: PCT/KR2016/000716
§ 371 (c)(1),
(2) Date: Oct. 17, 2017

(87) PCT Pub. No.: WO2016/167448
PCT Pub. Date: Oct. 20, 2016

(65) Prior Publication Data
US 2018/0105658 A1    Apr. 19, 2018

(30) Foreign Application Priority Data

Apr. 17, 2015 (KR) .................. 10-2015-0054545

(51) Int. Cl.
| | | |
|---|---|---|
| *G02F 1/13357* | (2006.01) | |
| *C08K 3/22* | (2006.01) | |
| *C08L 33/06* | (2006.01) | |
| *C08K 9/08* | (2006.01) | |
| *C08J 5/18* | (2006.01) | |
| *C08K 3/30* | (2006.01) | |

(52) U.S. Cl.
CPC .......... *G02F 1/133606* (2013.01); *C08J 5/18* (2013.01); *C08K 3/22* (2013.01); *C08K 9/08* (2013.01); *C08L 33/06* (2013.01); *G02F 1/133603* (2013.01); *C08K 3/30* (2013.01); *C08K 2201/003* (2013.01);
(Continued)

(58) Field of Classification Search
CPC ......... Y10T 428/1014; Y10T 428/1041; C07F 7/12; C07F 7/122; C09K 19/322;
(Continued)

(56) References Cited

U.S. PATENT DOCUMENTS

| | | | | |
|---|---|---|---|---|
| 2005/0254227 A1* | 11/2005 | Bilodeau | ................... | F21K 2/06 362/34 |
| 2010/0174024 A1* | 7/2010 | Du | ........................... | C08K 3/22 524/428 |

(Continued)

FOREIGN PATENT DOCUMENTS

| | | |
|---|---|---|
| KR | 10-2011-0005177 A | 1/2011 |
| KR | 10-2013-0027317 A | 3/2013 |

(Continued)

*Primary Examiner* — Sophie Hon
(74) *Attorney, Agent, or Firm* — Birch, Stewart, Kolasch & Birch, LLP (57) ABSTRACT

The embodiment relates to a quantum dot-polymer composite and a method for producing the same, wherein the quantum dot-polymer composite includes: a first phase made of a matrix resin; a second phase dispersed and distributed in the first phase, comprising a quantum dot, and having a spherical shape; and a micro scattering agent distributed in an interface between the first phase and the second phase along a surface of the second phase.

21 Claims, 4 Drawing Sheets

(52) U.S. Cl.
CPC .. *C08K 2201/014* (2013.01); *G02F 1/133615* (2013.01); *G02F 2001/133614* (2013.01); *G02F 2202/022* (2013.01); *G02F 2202/36* (2013.01); *G02F 2203/055* (2013.01); *Y10T 428/1041* (2015.01)

(58) Field of Classification Search
CPC .............. C09K 19/52; C09K 19/56; C09K 2019/0448; C09K 2019/122; G02F 1/133711; G02F 1/133719; G02F 1/133602; G02F 1/133606; G02F 2202/36; C08K 9/08; C08K 2201/003; C08L 33/06
See application file for complete search history.

(56) References Cited

U.S. PATENT DOCUMENTS

| | | | | |
|---|---|---|---|---|
| 2012/0113672 | A1* | 5/2012 | Dubrow | G02B 6/0073 362/602 |
| 2013/0265522 | A1* | 10/2013 | Jung | G02F 1/1336 349/61 |
| 2015/0047765 | A1 | 2/2015 | Vo et al. | |
| 2015/0054425 | A1* | 2/2015 | Guschl | C08G 77/38 315/294 |
| 2015/0072092 | A1* | 3/2015 | Seo | H01L 33/502 428/36.91 |
| 2015/0344776 | A1* | 12/2015 | Bootman | C09K 11/025 252/301.36 |
| 2015/0368553 | A1* | 12/2015 | Nelson | B32B 7/12 428/323 |

FOREIGN PATENT DOCUMENTS

| | | | |
|---|---|---|---|
| KR | 10-2013-0112990 A | 10/2013 | |
| KR | 10-2014-0144167 A | 12/2014 | |
| KR | 10-2015-0035493 A | 4/2015 | |
| WO | WO-2013137689 A1 * | 9/2013 | ............ C09K 11/02 |
| WO | WO 2014/113562 A1 | 7/2014 | |

\* cited by examiner

EXAMPLE 3     EXAMPLE 2     EXAMPLE 1     COMPARATIVE EXAMPLE 1

[Fig. 7]

METHOD FOR QUANTUM DOT-POLYMER COMPOSITE, QUANTUM DOT-POLYMER COMPOSITE, LIGHT CONVERSION FILM COMPRISING SAME, BACKLIGHT UNIT, AND DISPLAY DEVICE

CROSS-REFERENCE TO RELATED APPLICATIONS:

This application is the National Phase of PCT International Application No. PCT/KR2016/000716, filed on Jan. 22, 2016, which claims priority under 35 U.S.C. 119(a) to Patent Application No. 10-2015-0054545, filed in the Republic of Korea on Apr. 17, 2015, all of which are hereby expressly incorporated by reference into the present application.

TECHNICAL FIELD

The embodiment relates to a quantum dot-polymer composite and a method for producing the same, and more particularly, to a quantum dot-polymer composite having excellent reliability and light extraction efficiency, a quantum dot-polymer composite produced by using the same, a light conversion film including the same, a backlight unit, and a display device.

BACKGROUND ART

Recently, the display field has been rapidly developed in line with the information age. In response to this, as a Flat Panel Display (FPD) having advantages of slim profile, light weight, and low power consumption, a Liquid Crystal Display (LCD), a Plasma Display Panel device (PDP), an ElectroLuminescence Display (ELD), a Field Emission Display (FED), and the like have been developed to rapidly replace an existing Cathode Ray Tube (CRT) and is in the spotlight.

Among them, the LCD is attracting attention as a next-generation advanced and technology-intensive display device with low power consumption, excellent portability, and high added value. Since the LCD is a light-receiving type display device that does not form an image by emitting light by itself and forms an image by light incident from the outside, the LCD essentially requires a light source for providing light. In the past, a Cold Cathode Fluorescent Lamp (CCFL) has be mainly used as the light source of the LCD. However, in the case of the CCFL, as the size of the LCD increases, it is difficult to secure brightness uniformity and color purity is deteriorated.

Therefore, in recent years, three-color Light Emitting Diode (LED) has tended to be used instead of the CCFL as the light source of the LCD. When the three-color LED is used as the light source, high color purity can be realized to thereby implement high-quality images. However, since the three-color LED is expensive, the manufacturing cost thereof increases. Therefore, there have been proposed technologies that use a relatively inexpensive blue LED and implement white light by converting blue light into red light and green light by using a light conversion film including quantum dots (QDs).

In manufacturing the light conversion film using the quantum dots, it is important to uniformly disperse the quantum dots in a matrix resin. This is because, when the quantum dots are aggregated, a re-absorption process in which light emitted from the light source passes through two or more quantum dots occurs to deteriorate luminous efficiency. However, since currently commercially available quantum dots are mostly capped with a hydrophobic ligand or the like on the surfaces of the quantum dots so as to improve dispersibility, the types of dispersible medium are extremely limited. Thus, the types of resin usable for manufacturing a film are extremely limited.

Also, in the case of light conversion films proposed so far, a barrier film is attached to the upper and lower surfaces of the film, but a separate barrier means is not provided on the side portion of the film. Thus, quantum dots located at the edges of the film are oxidized by oxygen or moisture penetrating through the side portion. In order to prevent this, it is preferable to use a matrix resin having a low transmittance for oxygen and moisture. However, there is a problem in that quantum dots are not well dispersed in such resins having low air permeability and/or moisture permeability rate.

DISCLOSURE OF THE INVENTION

Technical Problem

The embodiment has been made to solve the above problems and provides a quantum dot-polymer composite having less deterioration of quantum dots and excellent optical performance, and a method for producing the same.

The embodiment also provides a light conversion film, a backlight unit, and a display device including the quantum dot-polymer composite and having excellent reliability and optical performance.

Technical Solution

In one embodiment, a quantum dot-polymer composite includes: a first phase made of a matrix resin; a second phase dispersed and distributed in the first phase, comprising a quantum dot therein, and having a spherical shape; and a micro scattering agent distributed in an interface between the first phase and the second phase and along a surface of the second phase.

In another embodiment, a method for producing a quantum dot-polymer composite includes: preparing a matrix resin solution including a micro scattering agent; preparing a quantum dot dispersion including a quantum dot; mixing the matrix resin solution and the quantum dot dispersion to form a resin mixed liquid; and applying the resin mixed liquid and curing the applied resin mixed liquid.

In further another embodiment, a light conversion film includes: a light conversion layer including a quantum dot-polymer composite including a first phase made of a matrix resin, a second phase dispersed and distributed in the first phase and including a quantum dot therein, and a micro scattering agent distributed on an interface between the first phase and the second phase along a surface of the second phase; and a barrier film disposed on at least one surface of the light conversion layer.

In still further another embodiment, a backlight unit includes: a light source unit including at least a light source; and a light conversion film, wherein the light conversion film comprises a light conversion layer including a quantum dot-polymer composite including a first phase made of a matrix resin, a second phase dispersed and distributed in the first phase and including a quantum dot therein, and a micro scattering agent distributed on an interface between the first phase and the second phase along a surface of the second phase; and a barrier film disposed on at least one surface of the light conversion layer.

In even further another embodiment, a display device includes: a backlight unit comprising a light source unit and a light conversion film; and a display panel disposed on the backlight unit, wherein the light conversion film comprises a light conversion layer including a quantum dot-polymer composite including a first phase made of a matrix resin, a second phase dispersed and distributed in the first phase and including a quantum dot therein, and a micro scattering agent distributed on an interface between the first phase and the second phase along a surface of the second phase; and a barrier film disposed on at least one surface of the light conversion layer.

Advantageous Effects

The quantum dot-polymer composite of the embodiment can use a matrix resin having low moisture permeability and low air permeability to produce a light conversion film having less deterioration of quantum dots in a high temperature and high humidity environment and thus having excellent stability.

Also, in the quantum dot-polymer composite of the embodiment, the micro scattering agent improves the light extraction efficiency, and thus, an excellent light conversion effect can be obtained even if a relatively small amount of quantum dot is used.

Also, in the quantum dot-polymer composite of the embodiment, the micro scattering agent is distributed along the interface of droplets of the quantum dot dispersion to prevent aggregation of the droplets to thereby make it possible to form fine phases having a uniform size, and prevent phase separation between the matrix resin and the quantum dot dispersion to thereby improve stability.

MODE FOR CARRYING OUT THE INVENTION

Hereinafter, embodiments will be described in detail with reference to the accompanying drawings. It is to be understood, however, that the following drawings are provided only to facilitate understanding of the embodiment, and the embodiment is not limited to the following drawings. Also, the shapes, sizes, ratios, angles, numbers and the like disclosed in the drawings are exemplary and the embodiment is not limited thereto. Like reference numerals refer to like elements throughout the specification. In the following description of the embodiment, a detailed description of known related arts will be omitted when it is determined that the gist of the embodiment may be unnecessarily obscured.

In a case where the terms "includes", "having", "done", etc. are used in this specification, other parts may be added unless "only" is used. As used herein, the singular forms "a," "an" and "the" are intended to include the plural forms as well, unless the context clearly indicates otherwise.

In interpreting the constituent elements, it is construed to include the error range even if there is no separate description.

In the case of a description of the positional relationship, for example, if the positional relationship between two parts is described as "on", "above", "under", or "next to" is not used, one or more other portions may be located between the two portions unless "immediately" or "directly" is used.

In the case of a description of a temporal relationship, for example, if a temporal posterior relationship is described by "after", "subsequent to", "next", "before", etc., a non-continuous case is also included unless "immediately" or "directly" is used.

The first, second, and the like are used to describe various components, but these components are not limited by these terms. These terms are only used to distinguish one component from another. Therefore, the first component mentioned below may be the second component within the technical spirit of the embodiment.

It is to be understood that the features of various embodiments may be partially or entirely coupled or combined with each other and technically various interlocking and driving are possible, and that the embodiments may be practiced independently of each other.

First, a method for producing a quantum dot-polymer composite according to the embodiment will be described.

Figure 1:
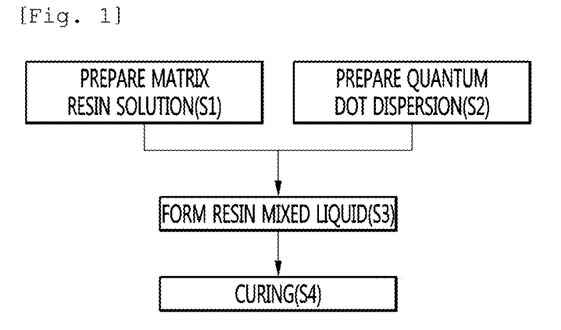
FIG. 1 is a view for describing a method for producing a quantum dot-polymer composite according to the embodiment.

FIG. 1 shows a method for producing a quantum dot-polymer composite according to the embodiment. As shown in FIG. 1, the method for producing the quantum dot-polymer composite according to the embodiment includes: preparing a matrix resin solution (S1); preparing a quantum dot dispersion; forming a resin mixed liquid (S3); and curing the resin mixed liquid (S4).

First, the matrix resin solution is prepared (S1). At this time, the matrix resin solution includes a matrix resin, a micro scattering agent, and a photoinitiator.

It is preferable that the matrix resin has low moisture permeability and low air permeability characteristics. The quantum dot has characteristics that are easily deteriorated by oxygen or moisture. Therefore, it is preferable to use a resin having low moisture permeability and low air permeability characteristics as a matrix resin surrounding the quantum dots so as to prevent deterioration of quantum dots. For example, the matrix resin may include, but is not limited to, epoxy, epoxy acrylate, polychlorotrifluoroethylene, polyethylene, polypropylene, polyvinyl alcohol, or a combination thereof.

The epoxy resin may be a resin having an epoxy group, for example, a bisphenol A resin, a bisphenol F resin, and the like. These epoxy resins have low moisture permeability and air permeability due to the characteristics of main chain.

On the other hand, the epoxy acrylate resin is a resin in which an epoxide group of an epoxy resin is substituted with an acrylic group. For example, the epoxy acrylate resin may be one selected from the group consisting of bisphenol A glycerol diacrylate, bisphenol A ethoxylate diacrylate, bisphenol A glycerolate dimethacrylate, bisphenol A ethoxylate dimethacrylate, and a combination thereof. The epoxy acrylate resin has low moisture permeability and air permeability due to characteristics of main chains like the epoxy resin.

Also, polychlorotrifluoroethylene has a low moisture and oxygen permeability, polyethylene and polypropylene have low moisture permeability, and polyvinyl alcohol has low oxygen permeability.

Preferably, the matrix resin may be an epoxy (meth) acrylate.

The epoxy (meth)acrylate resin usable in the embodiment is not limited thereto, but may include epoxy (meth)acrylate represented by [Formula 1] below.

[Formula 1]

In [Formula 1], R1 and R4 are each independently hydrogen or C1-C10 alkyl, and R2 and R3 are each independently (where a is an integer from 1 to 10) or (where b and c are each independently an integer from 0 to 10).

More preferably, the epoxy (meth)acrylate may be one selected from the group consisting of bisphenol A glycerolate diacrylate, bisphenol A ethoxylate diacrylate, bisphenol A glycerolate dimethacrylate, bisphenol A ethoxylate dimethacrylate, and a combination thereof.

On the other hand, the epoxy (meth)acrylate may be included in an amount of about 30 wt % to about 98 wt %, preferably about 40 wt % to about 80 wt %, and more preferably about 50 wt % to about 70 wt %, based on the total weight of the matrix resin solution. When the content of the epoxy (meth)acrylate in the matrix resin solution satisfies the above range, the film is easily formed and deterioration of the quantum dots can be effectively prevented.

By using epoxy (meth)acrylate having a low moisture permeability and low air permeability as main components of the matrix resin as described above, it is possible to obtain the effect of minimizing the deterioration of the quantum dots due to oxygen and moisture, particularly in the deterioration of the quantum dots at the edges.

Next, the micro scattering agent is used for improving the light extraction efficiency and reliability of the quantum dot-polymer composite, and it is preferable that the micro scattering agent has an average particle size of about 0.5 μm to 10 μm so as to cause Mie scattering.

On the other hand, as the micro scattering agent, an inorganic-based scattering agent and/or an organic-based scattering agent may be used. Specific examples of the inorganic-based scattering agent may include particles including silicon, silica, alumina, titanium dioxide (TiO2), zirconia (ZrO2), barium sulfate (BaSO4), zinc oxide (ZnO), and a combination thereof. Specific examples of the organic-based scattering agent may include polymer particles including a poly(methylmethacrylate) (PMMA)-based polymer, a benzoguanamine-based polymer, or a combination thereof. The inorganic-based scattering agent and the organic-based scattering agent may be used alone or in combination, and two or more light scattering agents having different sizes may be mixed and used.

The micro scattering agent scatters light generated from a light source (for convenience, referred to as first-order light) and light whose wavelength is converted by a quantum dot (for convenience, referred to as second-order light). When the first-order light is scattered, the path length of the first-order light increases, and the chance of meeting the quantum dot and the first-order light increases. Thus, a sufficient amount of light can be obtained with only a relatively small amount of quantum dots.

In addition, the micro scattering agent serves to prevent droplets, which are generated by mixing a quantum dot dispersion and a matrix resin, from adhering to the outer surface to aggregate droplets. When the matrix resin solution and the quantum dot dispersion are mixed, a layer separation occurs naturally over time due to the polarity difference between the matrix resin solution and the quantum dot dispersion. In order to prevent this, the viscosity must be increased. However, there is a problem in that film formation can not be smoothly performed. However, when the micro scattering agent is included in the matrix resin as in the embodiment, the micro scattering agent adheres to the surface of the droplet made of the quantum dot dispersion to prevent material transfer between the quantum dot dispersion and the matrix resin solution. As a result, fine and uniform droplets are well dispersed throughout the matrix resin solution to provide stability.

On the other hand, in order for the micro scattering agent to adhere well to the surface of the droplet, the micro scattering agent preferably has a polarity. To this end, a surface-treated micro scattering agent having a polarity can be used. The micro scattering agent surface-treated to have such polarity may be, but is not limited to, KS-200C of Kolon Industries.

On the other hand, the micro scattering agent may be included in an amount of about 1 wt % to about 40 wt %, preferably about 1 wt % to about 30 wt %, and more preferably about 5 wt % to about 25 wt %, based on the total weight of the matrix resin solution. If the content of the micro scattering agent is out of the above-described range, the light absorption by the micro scattering agent increases and the light utilization efficiency is lowered, and thus, haze may occur.

Next, the photoinitiator is used for initiating photopolymerization of the matrix resin. In the embodiment, radical-based photoinitiators well known in the art can be used without limitation. For example, IRGACURE 184 or the like may be used as the photoinitiator.

The photoinitiator may be included in an amount of about 1 wt % to about 15 wt %, preferably from about 5 wt % to about 15 wt %, and more preferably about 10 wt % to about 15 wt %, based on the total weight of the matrix resin solution. If the content of the photoinitiator is out of the above range, the performance of the light conversion film may be deteriorated.

Meanwhile, the matrix resin solution may further include components other than the above components in order to control physical properties such as viscosity, adhesive force, flexibility, hardenability, optical performance, and the like.

For example, the matrix resin solution may further include, if necessary, a (meth)acryl-based monomer including at least one functional group. The (meth)acryl-based monomer may be used for adjusting the viscosity by diluting the matrix resin solution, and may be a monofunctional or multifunctional (meth)acrylic monomer that can be polymerized together with an epoxy acrylate. Examples of the (meth)acryl-based monomer having at least one functional group may include trimethylolpropane triacrylate, trimethylolpropane trimethacrylate, tripropyleneglycol diacrylate, triethylene glycol diacrylate, 1,6-hexanediol diacrylate, tetrahydrofurfuryl acrylate, pentaerythritol triacrylate, diethylene glycol diemthacrylate, and the like.

The (meth)acryl-based monomer containing at least one functional group is preferably included in an amount of about 60 wt % or less, preferably about 0.1 wt % to about 50 wt %, and more preferably about 1 wt % to about 50 wt %. When the content of the (meth)acryl-based monomer exceeds 60 wt %, the performance of preventing the quantum dot deterioration may be lowered.

Next, the quantum dot dispersion is prepared (S2). The quantum dot dispersion includes a quantum dot, a non-polar (meth)acrylate monomer, and a photoinitiator.

The quantum dot means a light-emitting nanoparticle having a quantum confinement effect. The quantum dot is a semiconductor crystal having a size of several nanometers (nm) formed through a chemical synthesis process, and converts the wavelength of light injected from the light source and emits the light.

The quantum dot may be, for example, a particle having a single-layered or multi-layered structure including one or more semiconductor crystal selected from the group consisting of CdS, CdO, CdSe, CdTe, Cd3P2, Cd3As2, ZnS, ZnO, ZnSe, ZnTe, MnS, MnO, MnSe, MnTe, MgO, MgS, MgSe, MgTe, CaO, CaS, CaSe, CaTe, SrO, SrS, SrSe, SrTe, BaO, BaS, BaSe, BaTE, HgO, HgS, HgSe, HgTe, Hg12, AgI, AgBr, Al2O3, Al2S3, Al2Se3, Al2Te3, Ga2O3, Ga2S3, Ga2Se3, Ga2Te3, In2O3, In2S3, In2Se3, In2Te3, SiO2, GeO2, SnO2, SnS, SnSe, SnTe, PbO, PbO2, PbS, PbSe, PbTe, AlN, Alp, AlAs, AlSb, GaN, GaP, GaAs, GaSb, GaInP2, InN, InP, InAs, InSb, In2S3, In2Se3, TiO2, BP, Si, Ge, and a combination thereof.

On the other hand, the diameter of the quantum dot may be about 1 nm to about 10 nm. Since the emission wavelength varies depending on the size of the quantum dot, desired color light can be obtained by selecting a quantum dot having an appropriate size. In the embodiment, the quantum dots may include, for example, at least one selected from the group consisting of a quantum dot converting blue light into red light, a quantum dot converting blue light into green light, and a quantum dot converting green light into red light.

On the other hand, the quantum dots may include a capping layer on the surface of the quantum dots to prevent aggregation between the quantum dots. The capping layer may be a ligand layer coordinately bonded to the surface of the quantum dot, or may be a surface layer coated with hydrophobic organic molecules.

For example, the capping layer may be a material layer selected from the group consisting of phosphine oxides having long-chain alkyl or aryl groups that exhibit non-polarity, organic amines, organic acids, phosphonic acids, and a combination thereof. For example, the capping layer may be a material layer selected from the group consisting of tri-n-octylphosphine oxide (TOPO), stearic acid, palmitic acid, octadecylamine, hexadecylamine, dodecylamine, lauric acid, oleic acid, hexylphosphonic acid, and a combination thereof.

On the other hand, the quantum dot may be included in an amount of about 0.1 wt % to about 10 wt %, preferably about 1 wt % to about 10 wt %, and more preferably about 1 wt % to about 5 wt %, based on the total weight of the quantum dot dispersion. When the content of the quantum dots is out of the above range, the light conversion effect is insignificant, or the interval between the quantum dots decreases to deteriorate the light utilization efficiency.

The non-polar (meth)acrylate monomer is used for dispersing quantum dots and may include, but is not limited to, at least one selected from the group consisting of, for example, lauryl acrylate, lauryl methacrylate, isobornyl acrylate, and isobornyl methacrylate.

The non-polar (meth)acrylate monomer may be included in an amount of about 20 wt % to about 80 wt %, preferably about 30 wt % to about 80 wt %, and more preferably about 60 wt % to about 70 wt %, based on the total weight of the quantum dot dispersion. When the content of the non-polar (meth)acrylate monomer satisfies the above-described range, the quantum dots may be smoothly dispersed and the dispersion may be maintained even by the addition of oligomer.

Next, the photoinitiator is used for polymerizing non-polar acrylate in the curing step described later. In the embodiment, radical-based photopolymerization initiators well known in the art can be used without limitation. Also, two or more initiators may be mixed and used as the photoinitiator.

As the photoinitiator, a metal-based initiator, an epoxy-based initiator, an isocyanate-based initiator, an amine-based initiator, and the like may be used, and commercially available photoinitiators such as Irgacure 184 may be used.

On the other hand, the photoinitiator may be included in an amount of preferably about 0.5 wt % to about 30 wt %, and more preferably about 1 wt % to about 10 wt %, based on the total weight of the quantum dot dispersion.

On the other hand, the quantum dot dispersion may further include additional components other than the above components so as to control physical properties.

For example, the quantum dot dispersion may further include an oligomer having a polar moiety and a non-polar moiety, if necessary. The oligomer having the polar moiety and the non-polar moiety allow the droplets to be maintained without agglomerating with each other when the matrix resin solution and the quantum dot dispersion are mixed to form a droplet by phase separation. To this end, the oligomer must include a polar moiety capable of binding to the surface of the quantum dot and a non-polar moiety capable of dissolving the non-polar acrylate monomer.

On the other hand, the oligomer means a polymer having a weight average molecular weight of 1000 g/mol or less and including two or more repeating units.

In the embodiment, the form of the polar moiety and the non-polar moiety in the oligomer is not particularly limited. For example, the polar moiety and the non-polar moiety may have the form of a block copolymer in which a block composed of a polar moiety and a block composed of a non-polar moiety are combined, or a random copolymer in which a repeating unit having a polar moiety and a repeating unit having a non-polar moiety are randomly bonded to each other, the form in which a non-polar moiety is present in a main chain and a polar moiety is present in a side chain, or the form in which a polar moiety is present in a main chain and a non-polar moiety is present in a side chain.

At this time, it is preferable that the polar moiety includes at least one polar group selected from the group consisting of a ketone group, an ester group, an ether group, a carboxyl group, a hydroxyl group, an amide group, an amine group, and a cyclic acid anhydride group. On the other hand, the cyclic acid anhydride group may be, for example, a succinic anhydride group, a maleic anhydride group, a glutaric anhydride acid group, or a phthalic anhydride group.

On the other hand, the non-polar moiety may include a hydrocarbon chain including carbon and hydrogen.

On the other hand, the oligomer having the polar moiety and the non-polar moiety may be included in an amount of about 10 wt % to about 80 wt %, preferably about 20 wt % to about 70 wt %, and more preferably about 20 wt % to about 40 wt %, based on the total weight of the quantum dot dispersion.

Also, the quantum dot dispersion may further include, if necessary, a (meth)acryl-based monomer including at least one functional group. The (meth)acrylic monomer is used for polymerization with a non-polar acrylate monomer and/or an oligomer in a curing step described later to form a network of a mesh structure, and for example, trimethylolpropane triacrylate, trimethylolpropane trimethacrylate, tripropyleneglycol diacrylate, triethylene glycol diacrylate, 1,6-hexanediol diacrylate, tetrahydrofurfuryl acrylate, pentaerythritol triacrylate, diethylene glycol diemthacrylate, or the like may be used.

The (meth)acryl-based monomer including at least one functional group is included in an amount of about 30 wt % or less, preferably about 10 wt % or less, and more preferably about 5 wt % or less, based on the total weight of the quantum dot dispersion. If the content of the (meth)acryl-based monomer is too large, the dispersion of the quantum dots may be inhibited.

Also, the quantum dot dispersion may further include a nano scattering agent, if necessary. The nano scattering agent is a scattering agent having an average particle size of about 5 nm to about 200 nm, and is a scattering agent that differently scatters light according to wavelength by Rayleigh scattering. More specifically, the nano scattering agent reduces the degree of scattering in the order of blue, green, and red, thereby scattering first-order light and relatively suppressing scattering of second-order light. When such nano scattering agent is included in the quantum dot dispersion, the nano scattering agent serves to prevent the aggregation of quantum dots in the quantum dot dispersion, thereby minimizing the light re-absorption between the quantum dots and improving the light extraction efficiency.

The nano scattering agent may be an inorganic-based scattering agent and/or an organic-based scattering agent. The inorganic-based scattering agent may be, for example, a particle including one selected from the group consisting of silicon, silica, alumina, titanium dioxide ($TiO_2$), zirconia ($ZrO_2$), barium sulfate ($BaSO_4$), zinc oxide, and a combination thereof, and the organic-based scattering agent may be, for example, a polymethyl methacrylate (PMMA)-based polymer, a benzoguanamine-based polymer, or a combination thereof. The inorganic-based scattering agent and the organic-based scattering agent may be used alone or in combination, and two or more scattering agents having different sizes may be mixed and used.

On the other hand, the nano scattering agent may be included in an amount of about 20 wt % to less, preferably about 1 wt % to about 20 wt %, and more preferably about 5 wt % to about 15 wt %, based on the total weight of the matrix resin solution. If the content of the nano scattering agent is too large, the light absorption by the nano scattering agent increases and the light utilization efficiency is lowered, and thus, haze may occur.

On the other hand, if the polarity and size of the nano scattering agent are adjusted, the droplet size of the quantum dot dispersion described later can be adjusted.

When the matrix resin solution and the quantum dot dispersion are formed through the above process, the matrix resin solution and the quantum dot dispersion are mixed to form a resin mixed liquid (step S3).

The mixing ratio of the matrix resin solution to the quantum dot dispersion may be about 1:1 to about 4.9:0.1, preferably about 1:1 to about 4:1, and more preferably about 2.75:2.25 to about 3.5:1.5. If the mixing ratio is out of the above range, fine phase may not be formed, or the distance between the quantum dots becomes close to inhibit dispersion, and light efficiency deterioration may occur.

In the embodiment, since the matrix resin solution has a polarity and the quantum dot dispersion has non-polarity acrylate as main component, if the matrix resin solution is mixed with the quantum dot dispersion liquid, droplets including quantum dots in the matrix resin are formed in a dispersed form due to the polarity difference. At this time, the micro scattering agent having a polarity included in the matrix resin surrounds the surfaces of the droplets, so that the droplets can be stably dispersed.

Next, the resin mixed liquid is cured to form a quantum dot-polymer composite (step S4).

At this time, the curing may be performed by a method of applying a resin mixed liquid on a substrate and photo-curing the resin mixed liquid. For example, the curing can be performed by applying the resin mixed liquid on the substrate and then irradiating ultraviolet light or the like.

Figure 2:
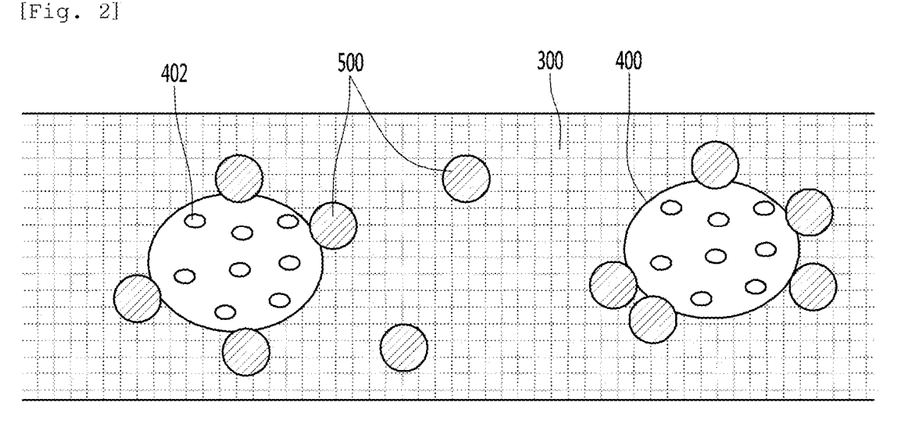
FIG. 2 is a view for describing a structure of a quantum dot-polymer composite according to the embodiment.

FIG. 2 is a view showing a structure of a quantum dot-polymer composite of the embodiment produced by the above-described method. As shown in FIG. 2, the quantum dot-polymer composite according to the embodiment includes a first phase 300 made of a matrix resin, a second phase 400 dispersed and distributed in the first phase 300 and including quantum dots therein, and a micro scattering agent 500 distributed on an interface between the first phase 300 and the second phase 400 and along the surface of the second phase 400.

At this time, as described above, the matrix resin constituting the first phase 300 may be made of a low moisture-permeability, low air-permeability resin, and preferably includes a repeating unit derived from an epoxy acrylate.

On the other hand, the repeating unit derived from the epoxy acrylate may be, but is not limited to, for example, a repeating unit represented by [Formula 4] below.

[Formula 4]

In [Formula 4], R1 and R4 are each independently hydrogen or C1-C10 alkyl, and R2 and R3 are each independently (where a is an integer from 1 to 10) or (where b and c are each independently an integer from 0 to 10).

On the other hand, the micro scattering agent 500 may be included in the first phase 300. At this time, a part of the micro scattering agent 500 may be distributed on the interface between the first phase 300 and the second phase 400 and along the surface of the second phase 400, and the remainder is dispersed in the matrix resin. As described above, the micro scattering agent 500 preferably has an average particle size of about 0.5 μm to 10 μm, and may be at least one selected from the group consisting of silicon, silica, alumina, titanium dioxide, zirconia, barium sulfate, zinc oxide, a poly(methylmethacrylate)-based polymer, a benzoguanamine-based polymer, a combination thereof. Also, the micro scattering agent 500 may have a polarity, and more specifically, may be surface-treated to have a polarity.

On the other hand, the second phase 400 includes quantum dots 402 and is formed in a spherical shape. The quantum dot-polymer composite produced according to the method of the embodiment is characterized in that the micro scattering agent 500 is attached to the surface of the second phase 400 including the quantum dots 402, an thus the second phase 400 is not agglomerated and dispersed well in the first phase 300. Therefore, the size of the second phase 400 is formed relatively finely and uniformly. Specifically, the second phase 400 may have an average particle size of 50 μm or less, preferably 0.1 μm to 20 μm, and more preferably 0.1 μm to 10 μm.

On the other hand, the second phase 400 may further include a nano scattering agent therein. The nano-scattering agent preferably has an average particle size of about 5 nm to 200 nm, and may be at least one selected from the group consisting of silicon, silica, alumina, titanium dioxide, zirconia, barium sulfate, zinc oxide, a poly(methylmethacrylate)-based polymer, a benzoguanamine-based polymer, and a combination thereof.

On the other hand, the quantum dot-polymer composite may include a unit derived from a non-polar (meth)acrylate monomer. The non-polar (meth)acrylate monomer is included in the above-described quantum dot dispersion. For example, the non-polar (meth)acrylate monomer may be at least one selected from the group consisting of lauryl acrylate, lauryl methacrylate, isobornyl acrylate, and isobornyl methacrylate. The unit derived from the non-polar (meth)acrylate may be polymerized with the oligomer in the quantum dot dispersion and thus present in the second phase 400, and a part of the non-polar acrylate monomer is dissolved in the matrix resin solution during phase separation and thus may be present in the first phase 300.

Also, the quantum dot-polymer composite may further include a unit derived from an oligomer including a polar moiety and a non-polar moiety. At this time, the polar moiety and the non-polar moiety are the same as described above. That is, the polar moiety may include at least one polar group selected from the group consisting of a ketone group, an ester group, an ether group, a carboxyl group, a hydroxyl group, an amide group, an amine group, and a cyclic acid anhydride group, and the non-polar moiety may include a hydrocarbon chain including carbon and hydrogen.

Also, the quantum dot-polymer composite may further include a unit derived from a (meth)acryl-based monomer including at least one functional group. Examples of the (meth)acryl-based monomer including at least one functional group may be included in the quantum dot dispersion and/or the matrix resin solution for controlling physical properties and may include at least one selected from the group consisting of, for example, trimethylolpropane triacrylate, trimethylolpropane trimethacrylate, tripropyleneglycol diacrylate, triethylene glycol diacrylate, 1,6-hexanediol diacrylate, tetrahydrofurfuryl acrylate, pentaerythritol triacrylate, pentaerythritol triacrylate, diethylene glycol diemthacrylate, and the like.

The quantum dot-polymer composite of the embodiment can prevent aggregation of the second phase 400 due to the micro scattering agent 500 existing between the first phase 300 and the second phase 400, can form the second phase 400 finely and uniformly, and prevent moisture, air, and the like from permeating into the second phase (400), thereby providing excellent reliability.

Further, since the quantum dot-polymer composite of the embodiment uses a resin having low moisture permeability and low air permeability as a matrix resin, deterioration of quantum dots due to oxygen and moisture can be minimized.

Figure 3:
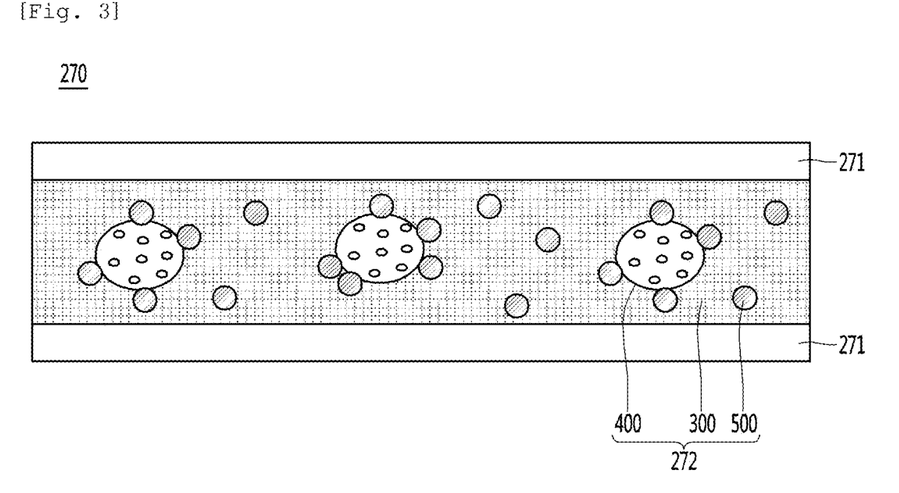
FIG. 3 is a view for describing a structure of a light conversion film according to the embodiment.

Next, the light conversion film of the embodiment will be described. FIG. 3 shows an embodiment of the light conversion film according to the embodiment. As shown in FIG. 3, the light conversion film 270 of the embodiment includes a light conversion layer 272 and at least one barrier film 271. The barrier film 271 may be disposed on one side or both sides of the light conversion film 270.

More specifically, the light conversion film 270 of the embodiment is may be produced by a method of forming a light conversion layer by applying a resin mixed liquid formed by mixing a matrix resin solution and a quantum dot dispersion on a barrier film 271 and then curing the resin mixed liquid. At this time, the light conversion layer 272 is dispersed and distributed in a quantum dot-polymer composite of the embodiment, that is, a quantum dot-polymer composite including a first phase 300 made of a matrix resin, a second phase 400 dispersed and distributed in the first phase 300 and including quantum dots 402 therein, and a micro scattering agent 500 distributed on an interface between the first phase 300 and the second phase 400 along the surface of the second phase 400. Since the quantum dot-polymer composite has been described in detail above, a detailed description thereof will be omitted.

On the other hand, the barrier film 271 is provided for supporting and protecting the light conversion layer 272. More specifically, the barrier film 271 is provided for prevent moisture or oxygen in outside air from being introduced into the light conversion layer 272 to deteriorate the quantum dots.

For this purpose, the barrier film 271 may include a single material or composite material having high moisture and/or oxygen barrier properties. For example, the barrier film 271 may include a polymer having high moisture and/or oxygen barrier properties such as polyethylene, polypropylene, polyvinyl chloride, polyvinyl alcohol, ethylene vinyl alcohol, polychlorotrifluoro Ethylene, polyvinylidene chloride, nylon, polyamino ether, cycloolefin homopolymer, or copolymer.

On the other hand, although the barrier film 271 is shown as a single layer in the figure, it is not limited thereto. The barrier film may be formed as a multilayer. For example, the barrier film 271 may have a structure in which a base substrate and a protective film disposed on the base substrate are laminated.

For example, the barrier film 271 may be formed by coating an inorganic film or an organic-inorganic hybrid film having high moisture and/or oxygen barrier properties on the base substrate. At this time, the inorganic film or the organic-inorganic hybrid film may include oxide or nitride of Si, Al, or the like as main component. On the other hand, in this case, as the base substrate, a polymer film having high light transmittance and heat resistance may be used. For example, a polymer film including a polyethylene terephthalate (PET), a polyethylene naphthalate (PEN), a cyclic olefin copolymer (COC), an olefin polymer (COP), or the like may be used.

The barrier film 271 has a moisture permeability of about 10-1 g/m²/day to about 10-5 g/m2/day under a condition of 37.8° C. and 100% relative humidity, and an air permeability of about 10-1 cc/m²/day/atm to 10-2 cc/m²/day/atm under a condition of 23° C. and 0% relative humidity.

Also, the linear transmittance of the barrier film 271 is preferably about 88% to 95% in the range of 420 nm to 680 nm in the visible light range.

Since the matrix resin of the light conversion layer 272 includes a resin having low moisture permeability and/or low air permeability as main component, the deterioration of the edge portion of the light conversion film 270 is remarkably small even in a high temperature and high humidity environment. Specifically, in the light conversion film of the embodiment, a damage length of the edge measured after leaving for 4 days at 60° C. and 90% relative humidity is preferably 2 mm or less, and preferably 1 mm or less.

Next, a backlight unit and a display device of the embodiment will be described.

Figure 4:
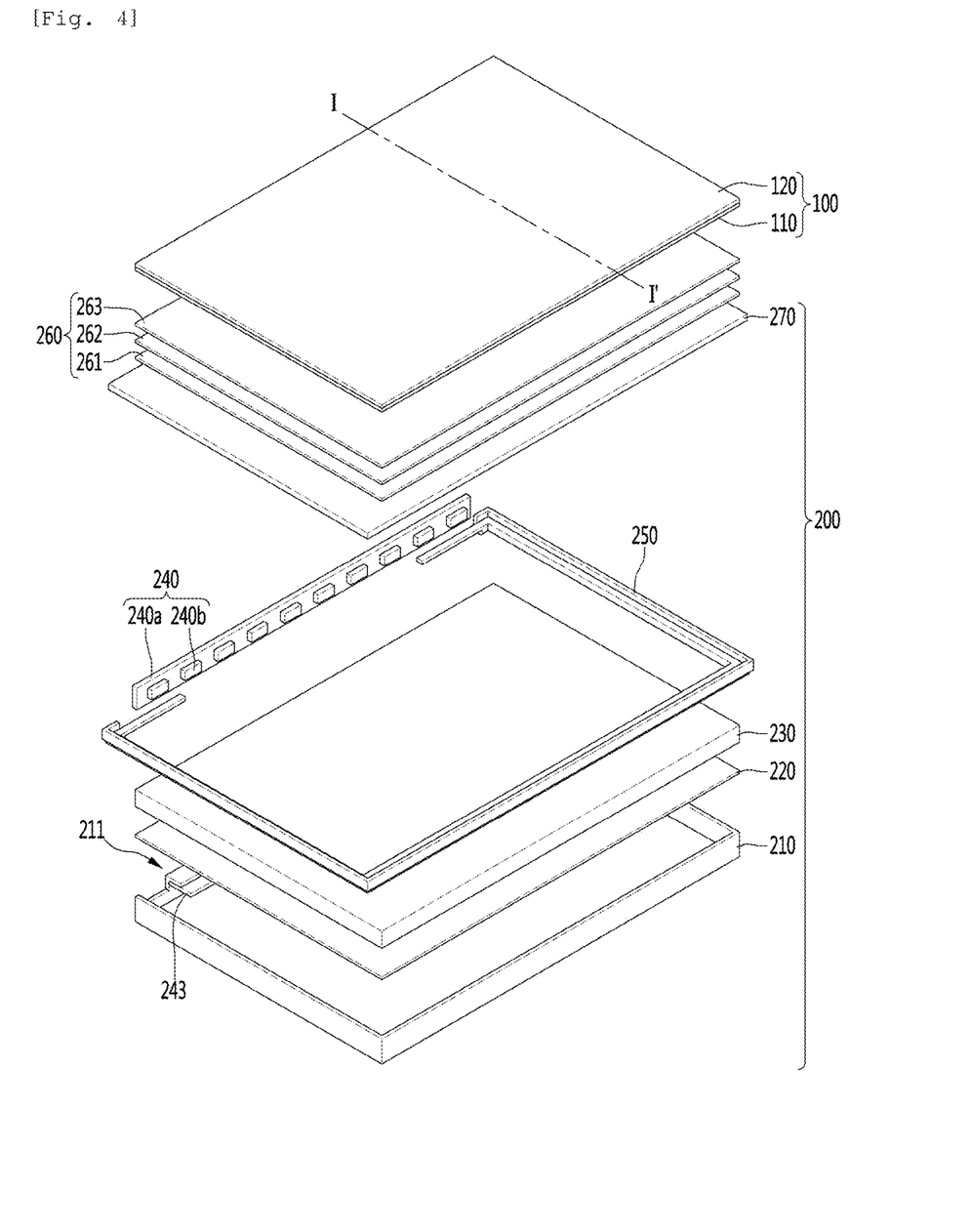
FIGS. 4 and 5 are views illustrating an embodiment of a display device according to the embodiment.
Figure 5:
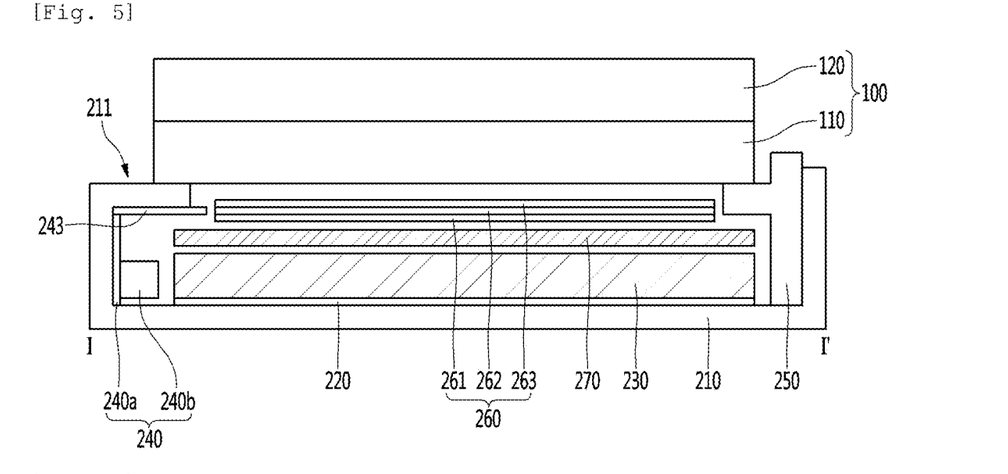

FIGS. 4 and 5 are views illustrating an embodiment of a display device according to the embodiment. As shown in FIGS. 4 and 5, the display device of the embodiment includes a backlight unit 200 and a display panel 100.

The backlight unit 200 and the display device of the embodiment are characterized by including the light conversion film 270 of the embodiment. More specifically, the backlight unit 200 is provided for providing light to the display panel 100 and includes a light source unit 240 and a light conversion film 270 of the embodiment. Also, the backlight unit 200 may further include, if necessary, a bottom case 210, a reflection plate 220, a light guide plate 230, a guide panel 250, and an optical sheet 260. Since details of the light conversion film 270 have been described above, other components of the backlight unit will be described.

First, the light source unit 240 may be disposed inside the bottom case 210 to provide light to the display panel 100.

The light source unit 240 includes a plurality of light sources 240b and a printed circuit board 240a on which the plurality of light sources 240b are mounted.

At this time, the light source 240b may be a blue light source that generates blue light. For example, the light source 240b may be a blue light emitting diode. In this case, the light conversion layer 272 of the light conversion film 270 may include a quantum dot-polymer complex including quantum dots converting blue light into red light and quantum dots converting blue light into green light.

Alternatively, the light source 240b may be a combination of a blue light source for generating blue light and a green light source for generating green light. For example, the light source 240b may be a combination of a blue light emitting diode and a green light emitting diode. In this case, the light conversion layer 272 of the light conversion film 270 may include a quantum dot-polymer complex including quantum dots converting blue light into red light and quantum dots converting green light into red light. In this case, since it is unnecessary to use green quantum dots that occupy a majority of the quantum dots used in the light conversion film, the amount of quantum dots can be drastically reduced, resulting in a reduction in the manufacturing cost of the light conversion film. Also, the thickness of the film is reduced, which is advantageous for a thickness reduction.

On the other hand, the printed circuit board 240a is electrically connected to the light source 240b. The light source 240b may be driven by receiving a drive signal through the printed circuit board 240a.

The printed circuit board 240a has a mounting surface on which the light source 240b is mounted and an adhesive surface facing the mounting surface. The adhesive surface of the printed circuit board 240a is attached to the bottom case 210. The printed circuit board 240a may be disposed on one side of the bottom case 210 in a bar shape.

Although the printed circuit board 240a is shown as being attached to the inner side surface of the bottom case 210 in the drawing, the embodiment is not limited thereto. The printed circuit board 240a may be attached to the inner upper surface of the bottom case 210, or may be attached to the lower surface of a bent extension portion 211 of the bottom case 210.

Although the light source unit 240 is shown as being disposed on one side of the bottom case 210 in the drawing, the embodiment is not limited thereto. The light source unit 240 may be disposed on both sides of the bottom case 210 facing each other. Also, although an edge-type backlight unit 200 is shown in the drawing, the backlight unit 200 may be a direct-type backlight unit 200. That is, the light source unit 240 may be disposed on the inner upper surface of the bottom case 210.

Meanwhile, the bottom case 210 has a top opened shape. Also, the bottom case 210 has side walls extending in the form of a closed curve for accommodating the light source unit 240, the light guide plate 230, the reflection plate 220, the optical sheet 260, and the light conversion film 270. At this time, at least one side wall of the bottom case 210 may include the bent extension portion 211 extending from the upper edge to cover the light source unit 240. That is, the cross-section of one side of the bottom case 210 may have a "⊏" shape. At this time, a reflection member 243 may be further disposed on the lower surface of the bent extension portion 211.

The reflection member 243 may be a light source housing, a reflection film, or a reflection tape. The reflection member 243 can prevent the light from the light source unit 240 from being directly emitted to the display panel 100. In addition, the reflective member 243 may increase the amount of light incident into the light guide plate 230. Thus, the reflection member 243 can improve the light efficiency, brightness, and image quality of the display device.

Meanwhile, the bent extension portion 211 provided in the bottom case 210 may be omitted. That is, the cross-section of one side of the bottom case 210 may have a "L" shape. The bottom case 210 is fastened to the guide panel 250.

The guide panel 250 includes a protrusion inward. The display panel 100 may be seated and supported on the protrusion of the guide panel 250. The guide panel 250 may also be referred to as a support main or a mold frame.

The guide panel 250 is disposed to surround the edge of the backlight unit 200 so as to be attached to the display panel 100. That is, the guide panel 250 has a frame shape. For example, the guide panel 250 may have a rectangular frame shape. Also, the guide panel 250 may have an opening corresponding to the bent extension portion 211 of the bottom case 210.

Although not shown in the drawing, the bottom case 210 and the guide panel 250 may be assembled with hooks or assembled and fastened with the protrusions and recesses, respectively. Also, the bottom case 210 and the guide panel 250 may be bonded to each other by an adhesive member.

However, the embodiment is not limited to the drawings, and the guide panel 250 may be disposed on the light source unit 240. At this time, the reflection member 243 may be disposed on the lower surface of the guide panel 250 corresponding to the light source unit 240.

Next, the light guide plate 230 uniformly guides the light provided from the light source unit 240 to the liquid crystal display panel 100 through total reflection, refraction, and scattering. Here, the light guide plate 230 is accommodated in the bottom case 210.

Although the light guide plate 230 is formed as having a constant thickness in the drawing, the shape of the light guide plate 230 is not limited thereto. For example, the thickness of the light guide plate 230 may be thinner at the central portion than at both sides of the light guide plate 230 in order to reduce the overall thickness of the backlight unit 200.

Also, one surface of the light guide plate 230 may include a pattern having a specific shape so as to supply a uniform surface light source. For example, the light guide plate 230 may include various patterns such as an elliptical pattern, a polygon pattern, and a hologram pattern in order to guide light incident thereon.

In the drawing, the light source unit 240 is disposed on the side surface of the light guide plate 230, but is not limited thereto. The light source unit 240 may be disposed to correspond to at least one surface of the light guide plate 230. For example, the light source unit 240 may be disposed to correspond to one side or both sides of the light guide plate 230, and the light source unit 240 may be disposed to correspond to the lower surface of the light guide plate 230.

The reflection plate 220 is disposed on a path of light emitted from the light source unit 240. Specifically, the reflection plate 220 is disposed between the light guide plate 230 and the bottom case 210. That is, the reflection plate 220 is disposed below the light guide plate 230. The reflection plate 220 reflects the light traveling toward the upper surface of the bottom case 210 to the light guide plate 230 to thereby increase light efficiency.

When the light source unit 240 is disposed to correspond to the lower surface of the light guide plate 230 unlike in the drawing, the reflection plate 220 may be disposed on the light source unit 240. Specifically, the reflection plate 220 is disposed on the printed circuit board 240a of the light source unit 240. Also, the optical member 220 may include a plurality of holes so that the plurality of light sources 240b can be fastened.

That is, the plurality of light sources 240b are inserted into the plurality of holes of the reflection plate 220, and the light sources 240b may be exposed to the outside through the holes. Accordingly, the reflection plate 220 may be disposed at the side of the light source 240b on the printed circuit board 240a.

The optical sheet 260 for diffusing and condensing light is disposed on the light guide plate 230. For example, the optical sheet 260 may include a diffusion sheet 261, a first prism sheet 262, a second prism sheet 263, and the like.

The diffusion sheet 261 is disposed on the light guide plate 230. The diffusion sheet 261 improves the uniformity of light passing therethrough. The diffusion sheet 261 may include a plurality of beads.

The first prism sheet 262 is disposed on the diffusion sheet 261. The second prism sheet 263 is disposed on the first prism sheet 262. The first prism sheet 262 and the second prism sheet 263 increase the straightness of light passing therethrough. Accordingly, the light emitted onto the light guide plate 230 can be processed into a surface light source of higher brightness by transmitting light through the optical sheet 260.

The light conversion film 270 may be disposed between the optical sheet 260 and the light guide plate 230.

Next, the display panel 100 is provided for realizing a screen and may be, for example, a liquid crystal display panel (LCD). For example, the display panel 100 includes a first substrate 110 and a second substrate 120 which are bonded together with a liquid crystal layer (not shown) interposed therebetween.

Further, although not shown in the figure, a polarizer (not shown) may be further disposed to selectively transmit only specific polarized light to the outer surfaces of the first substrate 110 and the second substrate 120. That is, a polarizing plate may be disposed on a back surface of the first substrate 110 and an upper surface of the second substrate 120.

Although not specifically shown in the figure, the display panel is divided into a display region and a non-display region. In the display region, a gate line and a data line are disposed on one surface of the first substrate 110. The gate line and the data line are disposed so as to vertically intersect each other with a gate insulating film interposed therebetween, and a pixel region may be defined by the intersection of the gate line and the data line.

The first substrate 110 may be a thin film transistor substrate. A thin film transistor (TFT) is disposed in the intersection region between the gate line and the data line on one surface of the first substrate 110. That is, the thin film transistor is provided in the pixel region. In addition, a pixel electrode is disposed in each pixel region on one surface of the first substrate 110. The thin film transistor and the pixel electrode may be electrically connected, and the thin film transistor may be electrically connected to the gate line and the data line.

The thin film transistor includes a gate electrode, a semiconductor layer, a source electrode, and a drain electrode. The gate electrode may be formed by branching from the gate line. Also, the source electrode may be formed by branching from the data line. The pixel electrode may be electrically connected to the drain electrode of the thin film transistor.

The thin film transistor may be formed to have a bottom gate structure, a top gate structure, or a double gate structure. That is, the structure and the like of the thin film transistor can be variously changed and modified without departing from the technical idea of the embodiments.

The second substrate 120 may be a color filter substrate. A black matrix having a grid shape is formed on one surface of the second substrate 120 of the display panel 100 so as to correspond to the region between the pixel regions while covering the non-display region such as the thin film transistor formed on the first substrate 110. Also, a red color filter layer, a green color filter layer, and a blue color filter layer may be included in the grid so as to be sequentially and repeatedly arranged in correspondence with the respective pixel regions. That is, each of the color filter layers may be separated by the black matrix.

Also, the display panel 100 includes a common electrode that forms an electric field with the pixel electrode so as to drive the liquid crystal layer. A twisted nematic (TN) mode, a vertical alignment (VA) mode, an in-plane switching (IPS) mode, or a fringe field switching (FFW) mode may be used to adjust the arrangement of the liquid crystal molecules. The common electrode may be disposed on the first substrate 110 or the second substrate 120 according to the method of adjusting the alignment of the liquid crystal molecules.

Also, the display panel 100 may be a display panel 100 having a color filter on transistor (COT) structure in which the thin film transistor, the color filter layer, and the black matrix are formed on the first substrate 110. The second substrate 120 is attached to the first substrate 110 with the liquid crystal layer interposed therebetween.

That is, the thin film transistor may be disposed on the first substrate 110, and the color filter layer may be disposed on the thin film transistor. At this time, a protection layer may be formed between the thin film transistor and the color filter layer.

Also, the pixel electrode electrically connected to the thin film transistor is disposed on the first substrate 110. At this time, in order to improve the aperture ratio and simplify the mask process, the black matrix may be omitted, and the common electrode may be formed to serve also as the black matrix.

Also, although not shown in the drawing, the display panel 100 is connected to a driving circuit unit (not shown) for supplying a driving signal from the outside. The driving circuit unit may be mounted on the substrate of the display panel 100, or may be connected to the display panel 100 through a connection member such as a tape carrier package.

Hereinafter, the embodiment will be described in more detail with reference to specific examples. However, the following examples are for illustrative purposes only and are not intended to limit the embodiment. That is, the embodiments can be modified in various forms, and the scope of the embodiment should not be construed to be limited due to the examples described below.

EXAMPLE 1

0.45 g of a micro scattering agent and 0.15 g of an initiator Irgacure 184 were added to 3.04 g of bisphenol A glycerolate diacrylate and then mixed to prepare a matrix resin solution.

0.005 mg of InP/ZnS core-shell quantum dot powder was added to 0.4 g of lauryl acrylate and 0.4 g of isobornyl methacrylate, and 0.2 g of an oligomer including a polar moiety and a non-polar moiety was mixed and stirred to prepare a quantum dot dispersion.

A resin mixed liquid obtained by mixing the matrix resin solution and the quantum dot dispersion at a weight ratio of 3.44:1 was applied between two barrier films (i-component, 50 μm), and was cured by exposure to UV to prepare a light conversion film.

EXAMPLE 2

0.58 g of a micro scattering agent and 0.14 g of an initiator Irgacure 184 were added to 2.88 g of bisphenol A glycerolate diacrylate and then mixed to prepare a matrix resin solution.

0.005 mg of InP/ZnS core-shell quantum dot powder was added to 0.4 g of lauryl acrylate and 0.4 g of isobornyl methacrylate, and 0.2 g of an oligomer including a polar moiety and a non-polar moiety was mixed and stirred to prepare a quantum dot dispersion.

A resin mixed liquid obtained by mixing the matrix resin solution and the quantum dot dispersion at a weight ratio of 3.44:1 was applied between two barrier films (i-component, 50 μm), and cured by exposure to UV to prepare a light conversion film.

EXAMPLE 3

0.69 g of a micro scattering agent and 0.14 g of an initiator Irgacure 184 were added to 2.77 g of bisphenol A glycerolate diacrylate and then mixed to prepare a matrix resin solution.

0.005 mg of InP/ZnS core-shell quantum dot powder was added to 0.4 g of lauryl acrylate and 0.4 g of isobornyl methacrylate, and 0.2 g of an oligomer including a polar moiety and a non-polar moiety was mixed and stirred to prepare a quantum dot dispersion.

A resin mixed liquid obtained by mixing the matrix resin solution and the quantum dot dispersion at a weight ratio of 3.44:1 was applied between two barrier films (i-component, 50 μm), and cured by exposure to UV to prepare a light conversion film.

COMPARATIVE EXAMPLE 1

0.17 g of an initiator Irgacure 184 was added to 3.42 g of bisphenol A glycerolate diacrylate and then mixed to prepare a matrix resin solution.

0.005 mg of InP/ZnS core-shell quantum dot powder was added to 0.4 g of lauryl acrylate and 0.4 g of isobornyl methacrylate, and 0.2 g of an oligomer including a polar moiety and a non-polar moiety was mixed and stirred to prepare a quantum dot dispersion.

A resin mixed liquid obtained by mixing the matrix resin solution and the quantum dot dispersion at a weight ratio of 3.44:1 was applied between two barrier films (i-component, 50 μm), and cured by exposure to UV to prepare a light conversion film.

EXPERIMENTAL EXAMPLE 1

Figure 6:
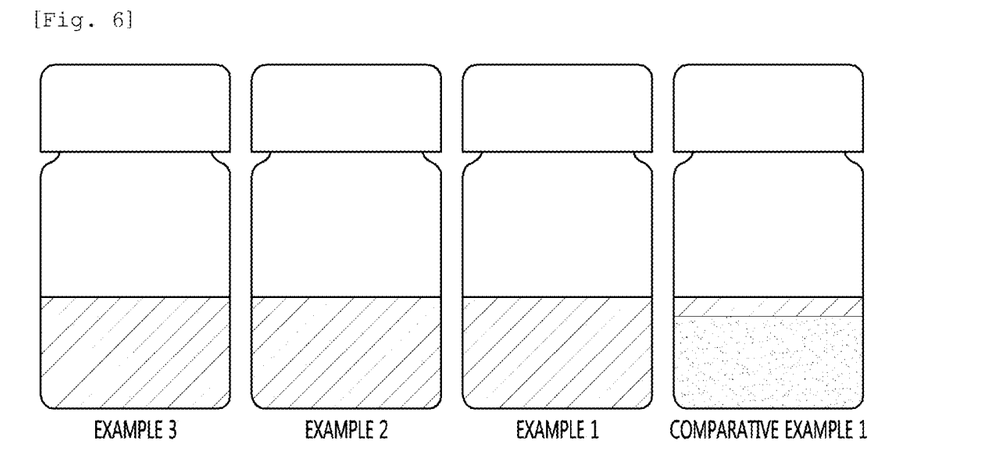
FIG. 6 is a photograph showing states of resin mixed liquids of examples 1 to 3 and comparative example 1.

The resin mixed liquids of Examples 1 to 3 and Comparative Example 1 were left at room temperature for 24 hours and then occurrence of phase separation was visually observed. FIG. 6 shows photographs of the resin mixed liquids. As shown in FIG. 6, in the case of Comparative Example 1 in which the micro scattering agent is not included, it can be confirmed that the matrix resin solution and the quantum dot dispersion are phase-separated. In contrast, in Examples 1 to in which the scattering agent was included, phase separation hardly occurred, and as the content of the scattering agent increased, stability was more excellent.

EXPERIMENTAL EXAMPLE 2

In order to confirm the light extraction efficiency, the light conversion films of Examples 1 to 3 and Comparative Example 1 were laminated on a backlight unit having an LED package in which a green fluorescent phosphor was inserted into a blue LED as a light source, optical sheets were laminated on the light conversion film, the brightness was measured with a color analyzer CA-210 manufactured by Minolta.

Figure 7:
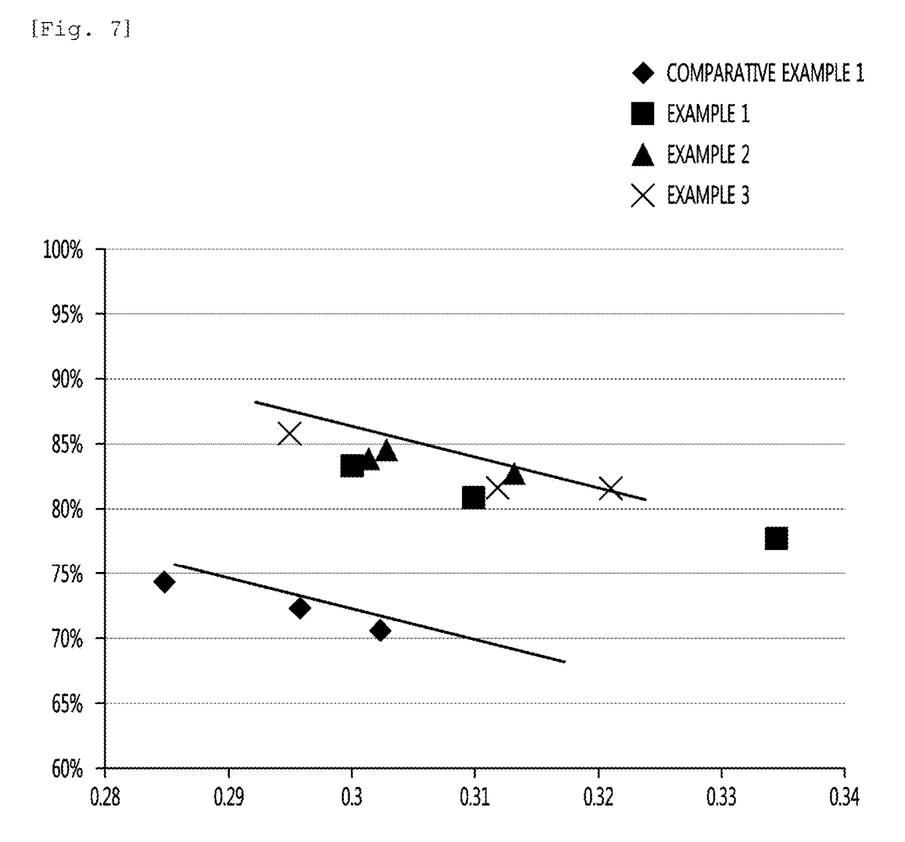
FIG. 7 is a graph showing a brightness measurement result of light conversion films of examples 1 to 3 and comparative example 1.

The measurement results are shown in FIG. 7. As shown in FIG. 7, when the light conversion films of Examples 1 to 3 including the micro scattering agent are applied, the brightness is higher than that of the light conversion film of Comparative Example 1.

INDUSTRIAL APPLICABILITY

The embodiment is applicable to a quantum dot-polymer composite, a light conversion film including the same, a backlight unit, and a display device.

The invention claimed is:

1. A quantum dot-polymer composite comprising:
a first phase made of a matrix resin and comprising a plurality of first scattering agents; and
a plurality of second phases dispersed and distributed in the first phase, each of the second phases comprising a plurality of quantum dots and a plurality of second scattering agents therein and having an outer surface that has a spherical shape,
wherein the plurality of first scattering agents are dispersed in the first phase and some of the plurality of first scattering agents are attached to the outer surface of each of the second phases along the outer surface of each of the second phases,
wherein the plurality of first scattering agents dispersed in the first phase have a polarity and an average particle size greater than an average particle size of the plurality of second scattering agents dispersed in each of the second phases, and
wherein the plurality of first scattering agents are only present in the first phase, and the plurality of second scattering agents are only present in each of the second phases.

2. The quantum dot-polymer composite according to claim 1, wherein the plurality of first scattering agents have the average particle size of 0.5 μm to 10 μm.

3. The quantum dot-polymer composite according to claim 1, wherein the plurality of first scattering agents comprise at least one selected from the group consisting of silicon, silica, alumina, titanium dioxide, zirconia, barium sulfate, zinc oxide, a poly(methylmethacrylate)-based polymer, a benzoguanamine-based polymer, and a combination thereof.

4. The quantum dot-polymer composite according to claim 1, wherein the plurality of first scattering agents are surface-treated.

5. The quantum dot-polymer composite according to claim 1, wherein the plurality of second scattering agents have the average particle size of 5 nm to 200 nm.

6. The quantum dot-polymer composite according to claim 1, wherein the matrix resin comprises a repeating unit derived from an epoxy(meth)acrylate.

7. The quantum dot-polymer composite according to claim 6, wherein the repeating unit derived from the epoxy (meth)acrylate is represented by [Formula 4]:

[Formula 4]

wherein, in [Formula 4],
R1 and R4 are each independently hydrogen or C1-C10 alkyl, and
R2 and R3 are each independently (where a is an integer from 1 to 10) or (where b and c are each independently an integer from 0 to 10).

8. The quantum dot-polymer composite according to claim 1, wherein a polymer in the quantum dot-polymer composite comprises a unit derived from a non-polar (meth) acrylate monomer and is included in each of the second phases.

9. The quantum dot-polymer composite according to claim 8, wherein the non-polar (meth)acrylate monomer comprises at least one selected from the group consisting of lauryl acrylate, lauryl methacrylate, isobornyl acrylate, and isobornyl methacrylate.

10. The quantum dot-polymer composite according to claim 1, wherein a polymer in the quantum dot-polymer composite further comprises a unit derived from a (meth) acryl-based monomer including at least one functional group and is included in the first phase.

11. The quantum dot-polymer composite according to claim 10, wherein the (meth)acryl-based monomer including the at least one functional function comprises at least one selected from the group consisting of trimethylolpropane triacrylate, trimethylolpropane trimethacryl ate, tripropylene glycol diacrylate, tri ethyl ene glycol diacrylate, hexanediol diacrylate, tetrahydrofurfuryl acrylate, pentaerythritol triacrylate, and diethylene glycol dimethacrylate.

12. The quantum dot-polymer composite according to claim 1, further comprising a polymer, the polymer comprising a unit derived from an oligomer that includes a polar moiety and a non-polar moiety and is included in each of the second phases.

13. The quantum dot-polymer composite according to claim 12, wherein the polar moiety comprises at least one polar group selected from the group consisting of a ketone group, an ester group, an ether group, a carboxyl group, a hydroxyl group, an amide group, an amine group, and a cyclic acid anhydride group.

14. The quantum dot-polymer composite according to claim 12, wherein the non-polar moiety comprises a hydrocarbon chain including carbon and hydrogen.

15. A light conversion film comprising:
a light conversion layer comprising a quantum dot-polymer composite including a first phase made of a matrix resin, the first phase including a plurality of first scattering agents, and a plurality of second phases dispersed and distributed in the first phase, each of the second phases including a plurality of quantum dots and a plurality of second scattering agents therein and having an outer surface that has a spherical shape, and
a barrier film disposed on at least one surface of the light conversion layer,
wherein the plurality of first scattering agents are dispersed in the first phase and some of the plurality of first scattering agents are attached to the outer surface of each of the second phases along the outer surface of each of the second phases,
wherein the plurality of first scattering agents dispersed in the first phase have a polarity and an average particle size greater than an average particle size of the plurality of second scattering agents dispersed in each of the second phases, and
wherein the plurality of first scattering agents are only present in the first phase, and the plurality of second scattering agents are only present in each of the second phases.

16. The light conversion film according to claim 15, wherein a damage length of an edge measured after leaving the light conversion film for 4 days at 60° C. and 90% relative humidity is 2 mm or less.

17. The light conversion film according to claim 15, wherein the quantum dot-polymer composite comprises at least one selected from the group consisting of a quantum dot converting blue light into red light, a quantum dot converting blue light into green light, and a quantum dot converting green light into red light.

18. A backlight unit comprising:
a light source unit including at least a light source; and
a light conversion film,
wherein the light conversion film comprises:
a light conversion layer including a quantum dot-polymer composite including a first phase made of a matrix resin, the first phase including a plurality of first scattering agents, and a plurality of second phases dispersed and distributed in the first phase, each of the second phases including a plurality of quantum dots and a plurality of second scattering agents therein and having an outer surface that has a spherical shape; and
a barrier film disposed on at least one surface of the light conversion layer,
wherein the plurality of first scattering agents are dispersed in the first phase and some of the plurality of first scattering agents are attached to the outer surface of each of the second phases along the outer surface of each of the second phases,
wherein the plurality of first scattering agents dispersed in the first phase have a polarity and an average particle size greater than an average particle size of the plurality of second scattering agents dispersed in each of the second phases, and
wherein the plurality of first scattering agents are only present in the first phase, and the plurality of second scattering agents are only present in each of the second phases.

19. The backlight unit according to claim 18, wherein the light source comprises a blue light source emitting blue light, and
the quantum dot-polymer composite comprises a quantum dot converting the blue light into red light and a quantum dot converting the blue light into green light.

20. The backlight unit according to claim 18, wherein the light source comprises a blue light source emitting blue light and a green light emitting green light, and
the quantum dot-polymer composite comprises a quantum dot converting the blue light into red light and a quantum dot converting the green light into green light.

21. A display device comprising:
a backlight unit comprising a light source unit and a light conversion film; and
a display panel disposed on the backlight unit,
wherein the light conversion film comprises:
a light conversion layer including a quantum dot-polymer composite including a first phase made of a matrix resin, the first phase comprising a plurality of first scattering agents, and, a plurality of second phases dispersed and distributed in the first phase, each of the second phases including a plurality of quantum dots and a plurality of second scattering agents therein and having an outer surface that has a spherical shape; and
a barrier film disposed on at least one surface of the light conversion layer,
wherein the plurality of first scattering agents are dispersed in the first phase and some of the plurality of first scattering agents are attached to the outer surface of each of the second phases along the outer surface of each of the second phases,
wherein the plurality of first scattering agents dispersed in the first phase have a polarity and an average particle size greater than an average particle size of the plurality of second scattering agents dispersed in each of the second phases, and
wherein the plurality of first scattering agents are only present in the first phase, and the plurality of second scattering agents are only present in each of the second phases.

* * * * *